(12) United States Patent
VanDuyn et al.

(10) Patent No.: US 8,799,947 B2
(45) Date of Patent: Aug. 5, 2014

(54) ELECTRONIC PROGRAM GUIDES, SYSTEMS AND METHODS PROVIDING VARIABLE SIZE OF TEXTUAL INFORMATION

(75) Inventors: Luke VanDuyn, Highlands Ranch, CO (US); Daniel Rudolph, Castle Rock, CO (US); Matthew Coburn, Denver, CO (US); Karen Taxier, Highlands Ranch, CO (US)

(73) Assignee: EchoStar Technologies, L.L.C.

( * ) Notice: Subject to any disclaimer, the term of this patent is extended or adjusted under 35 U.S.C. 154(b) by 417 days.

(21) Appl. No.: 12/370,416

(22) Filed: Feb. 12, 2009

(65) Prior Publication Data

US 2010/0205632 A1 Aug. 12, 2010

(51) Int. Cl.
*H04N 5/445* (2011.01)
*H04N 21/44* (2011.01)
*H04N 21/485* (2011.01)
*H04N 21/431* (2011.01)
*H04N 21/442* (2011.01)
*H04N 21/482* (2011.01)

(52) U.S. Cl.
CPC ..... *H04N 5/44543* (2013.01); *H04N 21/44012* (2013.01); *H04N 21/4858* (2013.01); *H04N 21/4314* (2013.01); *H04N 21/4312* (2013.01); *H04N 21/44222* (2013.01); *H04N 21/482* (2013.01)
USPC ................................. 725/39; 725/44; 725/52

(58) Field of Classification Search
USPC ...................................................... 725/37–61
See application file for complete search history.

(56) References Cited

U.S. PATENT DOCUMENTS

| 6,392,709 | B1* | 5/2002 | Orito | 348/569 |
|---|---|---|---|---|
| 6,577,350 | B1* | 6/2003 | Proehl et al. | 348/564 |
| 2005/0102634 | A1* | 5/2005 | Sloo | 715/823 |
| 2005/0283739 | A1* | 12/2005 | Mohr et al. | 715/800 |
| 2006/0130093 | A1* | 6/2006 | Feng et al. | 725/39 |
| 2006/0143657 | A1* | 6/2006 | Song | 725/52 |
| 2007/0074252 | A1* | 3/2007 | Nazarian et al. | 725/46 |
| 2008/0301735 | A1* | 12/2008 | Chicles | 725/47 |
| 2009/0031343 | A1* | 1/2009 | Sharkey | 725/39 |

FOREIGN PATENT DOCUMENTS

| JP | 2002-135679 | 5/2002 |
|---|---|---|
| JP | 2007-036527 | 2/2007 |
| KR | 10-2007-0044304 | 4/2007 |

OTHER PUBLICATIONS

International Search Report and Written Opinion dated Aug. 31, 2010, PCT/US2010/023652, 7 pages.

* cited by examiner

*Primary Examiner* — Jason J Chung
*Assistant Examiner* — Carmine Malangone
(74) *Attorney, Agent, or Firm* — Ingrassia Fisher & Lorenz, P.C.

(57) ABSTRACT

An enhanced electronic program guide (EPG) for television programming may be provided by changing a size of at least a portion of textual information to be displayed in the EPG. In embodiments, a television receiving device may include: a memory configured to store an EPG, the EPG including textual information corresponding to television programs scheduled to be broadcast; a user interface configured to receive user input; and a processor in communication with the memory and the user interface, configured to output the EPG to be displayed with at least one portion of the textual information in a first size in response to first user input received via the user interface, and configured to output the EPG to be displayed with the at least one portion of the textual information in a second size different from the first size in response to a second user input received via the user interface.

6 Claims, 5 Drawing Sheets

FIG.2

| PROGRAM GUIDE | | | 9:52AM FRI 2/29 | ? | AA ▽ △ |
|---|---|---|---|---|---|
| ALL CHAN | ALL SUB | HD | | | |

NIP TUCK "RAZORS EDGE" (2005) RATED: TV MA
HAVING REACHED THE ZENITH OF HIS SUCCESS, A STRAIGHT-LACED PLASTIC SURGEON BEGINS TO WITNESS THE CRUMBLING OF HIS DREAMS AND THE DECAY OF HIS PERFECT LIFE, AS HE JUGGLES A SEX-ADDICTED BUSINESS PARTNER, ADULTEROUS WIFE AND CHILDREN.

| DATED 3/19 | 8:00 | 8:30 | 9:00 | 9:30 | 10:00 | 10:30 |
|---|---|---|---|---|---|---|
| 9481 FLVNG | THE MISSION | | BEHIND THE SCENES | FIRST LOOK | BEHIND THE SCENES | |
| 9483 HBO | LES MISERABLES | | | | | |
| 9486 FX | NIP TUCK | | RESCUE ME | | TOM | |
| 004-00 USA | SEVENTH HEAVEN | | SEX IN THE CITY | | MARRIED WITH CHILDREN | MARRIED WITH CHILDREN |
| 007-00 TBS | BUFFY: THE BLOODLUST | | FAMILY GUY | FAMILY GUY | CHARMED | |
| | | | | | FAMILY GUY | FAMILY GUY |

| PROGRAM GUIDE | | | | | 9:52AM FRI 2/29 | ? | AA ▽ △ |
|---|---|---|---|---|---|---|---|
| ALL CHAN | ALL SUB | HD | | | | | |

NIP TUCK "RAZORS EDGE" (2005) RATED: TV MA
HAVING REACHED THE ZENITH OF HIS SUCCESS, A STRAIGHT-LACED PLASTIC SURGEON BEGINS TO WITNESS THE CRUMBLING OF HIS DREAMS AND THE DECAY OF HIS PERFECT LIFE, AS HE JUGGLES A SEX-ADDICTED BUSINESS PARTNER, ADULTEROUS WIFE AND CHILDREN.

| DATED 3/19 | 8:00 | 8:30 | 9:00 | 9:30 | 10:00 | 10:30 |
|---|---|---|---|---|---|---|
| 9481 FLVNG | THE MISSION | | BEHIND THE SCENES | FIRST LOOK | BEHIND THE SCENES | |
| 9483 HBO | LES MISERABLES | | | | | |
| 9486 FX | NIP TUCK | | | RESCUE ME | TOM | |
| 004-00 USA | SEVENTH HEAVEN | | SEX IN THE CITY | | MARRIED WITH CHILDREN | MARRIED WITH CHILDREN |
| 007-00 TBS | BUFFY: THE BLOODLUST | | FAMILY GUY | FAMILY GUY | FAMILY GUY | FAMILY GUY |

FIG.3

| PROGRAM GUIDE | | | | 9:52AM FRI 2/29 | ? | AA | ▽ | △ |
|---|---|---|---|---|---|---|---|---|
| ALL CHAN | ALL SUB | HD | | | | | | |

NIP TUCK "RAZORS EDGE" (2005) RATED: TV MA <u>64</u>
HAVING REACHED THE ZENITH OF HIS SUCCESS, A STRAIGHT-LACED PLASTIC SURGEON BEGINS TO WITNESS THE CRUMBLING OF HIS DREAMS AND THE DECAY OF HIS PERFECT LIFE, AS HE JUGGLES A SEX-ADDICTED BUSINESS PARTNER, ADULTEROUS WIFE AND CHILDREN.

| DATED 3/19 | 8:00 | 8:30 | 9:00 | 9:30 |
|---|---|---|---|---|
| 9481 FLVNG | THE MISSION | BEHIND THE SCENES | FIRST LOOK | BEHIND THE SCENES |
| 9483 HBO | | LES MISERABLES | | |
| 9486 FX | NIP TUCK | | △ | RESCUE ME |
| 004-00 USA | SEVENTH HEAVEN | | SEX IN THE CITY | CHARMED |

FIG.4

ELECTRONIC PROGRAM GUIDES, SYSTEMS AND METHODS PROVIDING VARIABLE SIZE OF TEXTUAL INFORMATION

TECHNICAL FIELD

The inventive field relates generally to electronic program guides (EPGs) used by a client device, such as a set top box (STB), digital video recorder (DVR) or similar device. The inventive field also relates to providing an enhanced electronic program guide for such devices, and devices providing an enhanced electronic program guide.

BACKGROUND DISCUSSION

The proliferation of subscription television programming, the increasing number of available channels, and the corresponding increase in television programming have led to continued development of onscreen program directories and guides. Such onscreen programming solutions, collectively referred to herein as electronic program guides, have ranged from program information for each channel scrolling vertically across the screen to user controllable interfaces that allow users to examine scheduling information describing television programs currently on-air and to be broadcast in the future.

In direct broadcast satellite (DBS) systems, EPG information is periodically downloaded and updated, usually at regular intervals. Prior art approaches have allowed users to examine scheduling information that has been downloaded to the client device, either by scrolling sequentially through listings corresponding to one-half hour or hour increments or by directly accessing individual timeslots. Further, some EPGs may allow a user to directly access desired programs or even set programs to be recorded automatically.

Known EPGs provide access to program information in various ways. EPGs generally provide program information, such as the channel, the time slot and duration, and the title of the program. Other information about the program, such as a brief description of the content and/or the names of the actors, may also be presented. Known EPGs also provide limited user interactivity, such as moving between time slots to view program information and setting current or future programs for recording.

SUMMARY

Conventional EPGs may not provide any flexibility regarding the amount of information regarding programs that is displayed at a given time. For example, conventional EPGs may be configured to be displayed as a predetermined layout of time slots and channels along with other general features, such as areas for displaying current time and/or date, detailed information regarding a highlighted program in the EPG, currently tuned program, or the like. Typically, the predetermined layout, including predetermined font sizes for textual information, of the EPG governs the amount of information provided by display of the EPG, which is fit to the screen size of the display device. Thus, the screen size of the display device may determine the size of textual information in the EPG as displayed.

Various embodiments relate to systems and methods for enhancing an EPG. Enhancements may relate to providing a user with control of a size of textual information that is displayed in the EPG. In particular, enhancements may relate to providing different size textual information displayed in the EPG in response to user input.

Some embodiments may comprise a method of providing an enhanced EPG for display on a viewing screen. The method may include: storing an electronic program guide on a client device, the electronic program guide including textual information corresponding to television programs scheduled to be broadcast; receiving a first user input at the client device; outputting the electronic program guide from the client device to be displayed with at least one portion of the textual information in a first size in response to the first user input; receiving a second user input at the client device; and outputting the electronic program guide from the client device to be displayed with the at least one portion of the textual information in a second size different from the first size in response to the second user input.

In some embodiments, the method may include receiving a second instance of the second user input. In such embodiments, the method may further include outputting the electronic program guide from the client device to be displayed with the at least one portion of the textual information in the first size in response to the second instance of the second user input. Additionally or alternatively, the method may further include outputting the electronic program guide from the client device to be displayed with the at least one portion of the textual information in a third size different from the first and second sizes in response to the second instance of the second user input.

In some embodiments, outputting the electronic program guide from the client device to be displayed with the at least one portion of the textual information in a second size different from the first size may increase a size of the at least one portion of the textual information. In such embodiments, outputting the electronic program guide from the client device to be displayed with the at least one portion of the textual information in a second size different from the first size may reduce an amount of information in the electronic program guide to be displayed.

In some embodiments, the method may include identifying the at least one portion of the textual information in the electronic program guide, and outputting the electronic program guide from the client device to be displayed with only the identified at least one portion of the textual information in a second size different from the first size in response to the second user input. In some embodiments in which the electronic program guide to be displayed is divided into at least a two-dimensional grid of timeslots containing textual information corresponding to programs scheduled to be broadcast during respective ones of the timeslots, the method may include: identifying the at least one portion of the textual information by identifying one of the timeslots; and outputting the electronic program guide from the client device to be displayed with the identified at least one portion of the textual information in a second size different from the first size in response to the second user input.

In some embodiments in which the electronic program guide to be displayed includes an area in addition to the two-dimensional grid of timeslots, which area contains additional textual information corresponding to a program of one of the timeslots, the method may include: outputting the electronic program guide from the client device to be displayed with at least one portion of the textual information in the first size in response to the first user input includes outputting the electronic program guide from the client device to be displayed with the additional information in a respective first size; identifying the at least one portion of the textual information by identifying one of the timeslots identifies the one of the timeslots; and outputting the electronic program guide from the client device to be displayed with the identified at least one portion of the textual information in a second size different from the first size includes outputting the additional information in a respective second size different from the respective first size. In such embodiments, outputting the electronic program guide from the client device to be displayed with the at least one portion of the textual information in a second size different from the first size may be performed by outputting the electronic program guide from the client device to be displayed with only the identified at least one portion of the textual information and the additional information in the second size and the respective second size, respectively.

Some embodiments may comprise a television receiving device. The device may include: a memory configured to store an electronic program guide, the electronic program guide including textual information corresponding to television programs scheduled to be broadcast; a user interface configured to receive user input; and a processor in communication with the memory and the user interface. The processor may be configured to output the electronic program guide to be displayed with at least one portion of the textual information in a first size in response to first user input received via the user interface, and configured to output the electronic program guide to be displayed with the at least one portion of the textual information in a second size different from the first size in response to a second user input received via the user interface.

In some embodiments, the processor may be configured to output the electronic program guide to be displayed with the at least one portion of the textual information in the first size in response to a second instance of the second user input received via the user interface. Additionally or alternatively, the processor may be configured to output the electronic program guide to be displayed with the at least one portion of the textual information in a third size different from the first and second sizes in response to a second instance of the second user input received via the user interface.

In some embodiments, the processor may be configured to increase a size of the at least one portion of the textual information in response to the second user input received via the user interface. In such embodiments, the processor may be configured to output less information in the electronic program guide to be displayed in response to the second user input received via the user interface.

In some embodiments, the processor may be configured to output the electronic program guide to be displayed with only an identified portion of the textual information in a second size different from the first size in response to the second user input.

In some embodiments, the processor may be configured to output the electronic program guide to be displayed as at least a two-dimensional grid of timeslots containing textual information corresponding to programs scheduled to be broadcast during respective ones of the timeslots. In such embodiments, the processor may be configured to output the electronic program guide to be displayed with the textual information of an identified one of the timeslots in a second size different from the first size in response to the second user input.

In some embodiments, the processor may further be configured to output the electronic program guide to be displayed including an area in addition to the two-dimensional grid of timeslots, which area contains additional textual information corresponding to a program of one of the timeslots. In such embodiments, the processor may be configured to output the electronic program guide to be displayed with the additional information in a respective first size in response to the first user input, and is configured to output the electronic program guide from the client device to be displayed with the additional information in a respective second size different from the respective first size in response to the second user input. In such embodiments, the processor may also be configured to output the electronic program guide to be displayed with only the identified at least one portion of the textual information and the additional information in the second size and the respective second size, respectively.

Some embodiments may provide an enhanced EPG in the form of a graphical user interface for a television receiving device. The graphical user interface may include: an electronic program guide divided into at least a two-dimensional grid of timeslots containing textual information corresponding to programs scheduled to be broadcast during respective ones of the timeslots; and at least one icon configured to cause the television receiving device to change a size of at least one portion of the textual information displayed in the electronic program guide.

Some embodiments may provide an enhanced EPG in the form of a computer-readable storage medium. The computer-readable storage medium may include instructions stored thereon that, when executed by a processor, cause the processor to provide an electronic program guide for display on a viewing screen by: accessing an electronic program guide, the electronic program guide including textual information corresponding to television programs scheduled to be broadcast; outputting the electronic program guide to be displayed with at least one portion of the textual information in a first size in response to a first input; and outputting the electronic program guide to be displayed with the at least one portion of the textual information in a second size different from the first size in response to a second input.

BRIEF DESCRIPTION OF THE DRAWINGS

Various details of the present invention may be better understood on reading the following detailed description of non-limiting embodiments, and on examining the accompanying drawings, in which:

FIG. 2 illustrates an example of a display of an enhanced EPG output in response to a first user input.

FIG. 3 illustrates the example of FIG. 2 with a second user input depicted.

FIG. 4 illustrates an example of a display of an enhanced EPG output in response to the second user input.

DETAILED DESCRIPTION OF EMBODIMENTS

Figure 1:
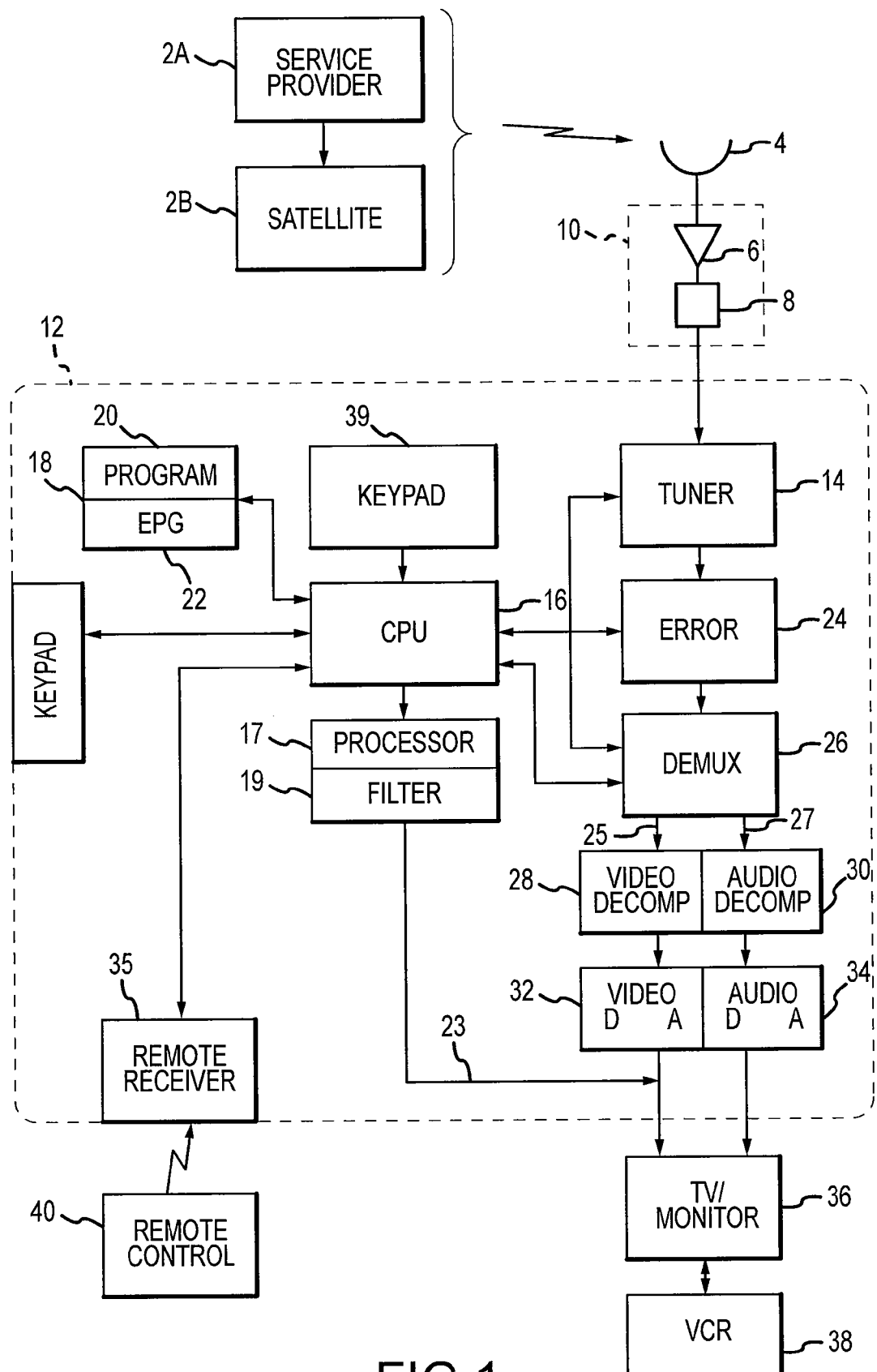
FIG. 1 is a block diagram illustrating major components of an example of a direct broadcast satellite television system.

As used herein, the terms "electronic programming guide" or "EPG" are intended to encompass an interface provided to a user and an underlying television broadcast system or component that supports functionality with the programming content. The enhanced EPG described herein may be considered to be embodied in the interface, a display, such as a televisions or monitor, software and/or hardware, either alone or in combination. As such, the term EPG is used in a broad sense for the sake of clarity in the description, without being limiting.

The embodiments shown in the Figures illustrate graphical user interfaces, methods and systems that may provide an enhanced EPG. Enhancements may relate to providing an EPG that allows a size of textual information as displayed to be altered or adjusted, such as by temporarily enlarging or magnifying the textual information. In particular, enhancements may relate to providing an EPG in which a size of identified textual information is changed for display. For example, the identified textual information may be displayed in a larger size in response to received user input. The amount of information displayed may be reduced as a result because the larger size of the textual information as displayed may encompass more of the viewing screen on which the EPG is displayed.

Although embodiments are described herein in terms of providing an enhanced EPG, it should be understood that the principles described may be applied to a television receiving device so that other textual information to be displayed via a display device, such as a television or monitor, may be altered in size in response to user input. Thus, textual information displayed for setting and/or managing timers for viewing and/or recording television programs, displayed as pop-ups during television programs, or displayed as part of any menu or other interface for interacting with a television receiving device may be selectively displayed in different sizes based on user input. In general, the principles described herein may be useful anytime textual information is to be displayed to a user of the television receiving device.

As described herein, displaying textual information in a different size in response to user input may allow a user to change a size of the textual information as it is displayed. In other words, once textual information is being output and displayed to the user, the user may provide input that causes the size of at least some of the displayed textual information to be displayed in a different size. Thus, a user may be provided with dynamic or interactive control of a size of textual information as it is displayed.

In general, embodiments described herein may provide control of a size of displayed textual information so that the textual information may be selectively displayed in a larger size so as to be more easily read by the user. Embodiments described herein may also provide such control so that an amount of textual information that is displayed may be altered by the user.

Various implementations are possible. For example, satellite, cable, analog or digital terrestrial, internet or other broadcasting technologies may be suitable. Thus, while the following description provides an example in the context of a television service provider employing a satellite broadcast system, it should be understood that such description is not limiting.

Figure 5:
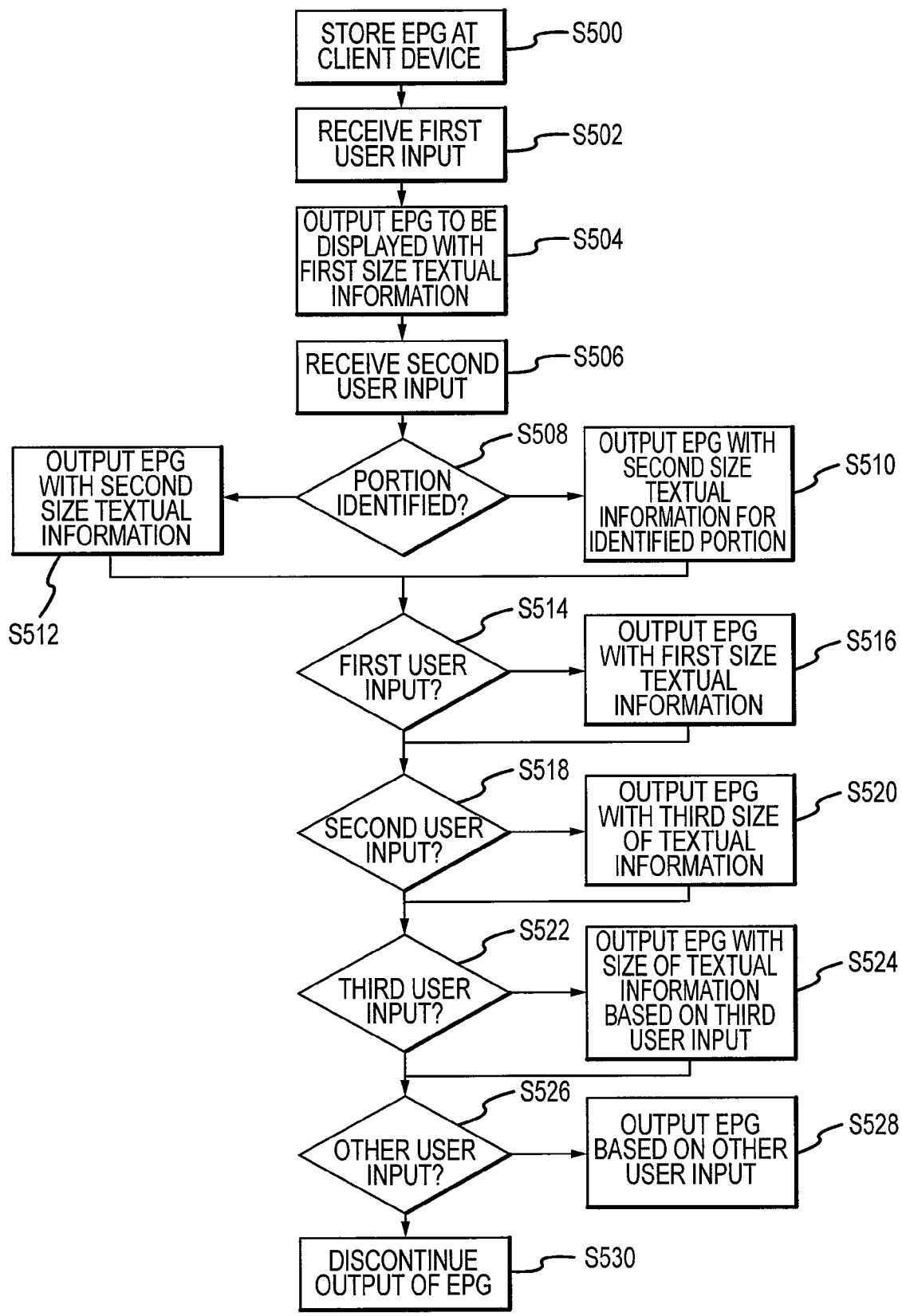
FIG. 5 is a flowchart illustrating a method of providing an enhanced EPG.

The block diagram shown in FIG. 1, the displays shown in FIGS. 2, 3 and 4 and the flowchart shown in FIG. 5 are for illustration only and are not intended to represent the only possible displays, process flows and system configurations. In particular, it should be understood that process steps may be added, omitted and reordered as may be suitable to a particular application. Also, individual components may be added, omitted, replaced and interrelated as may be suitable to a particular application. All details appurtenant to implementing the exemplary processes and systems that are well understood in the art are omitted for simplicity and clarity.

FIG. 1 is a block diagram that shows various components that may be used to implement various features of the present invention. It should be understood that this diagram and the description thereof is intended to provide a general understanding of how the principles described herein may be implemented, and is not exhaustive of implementations that may be envisioned. For example, a direct broadcast satellite system incorporating packetized transmission according to the MPEG-2 standard may be used, although any programming source that includes an EPG, or transmits data to be incorporated into an EPG, is contemplated. Encrypted direct broadcast satellite (DBS) signals may be transmitted from a source 2, such as a television service provider 2A via a satellite 2B. Such signals may be received as downlinked signals by a satellite antenna 4, such as a parabolic dish of approximately eighteen to thirty-six inches in diameter in one embodiment. Front end processing of the satellite signals may be accomplished by a low noise block converter feed (LNBF) provided in the antenna focal point. This may include a converter module 10 with a low noise amplifier 6, which receives the signals from the feed, and by a down converter 8, which converts the entire frequency band of the satellite signals to a lower frequency range that may be efficiently transmitted, for example, via coaxial cable to a client device, such as a satellite receiver 12. A tuner 14 may select a specific channel from the downlinked signal 2 and feed the selected channel to an error correction and packet synchronization module 24. The error correction and packet synchronization module 24 may output a fully compliant transport stream, which may be directed to a packet demultiplexer 26. Various encoding or formats may be used.

The packet demultiplexer 26 may be an integrated circuit that accepts the packetized, time domain multiplexed data stream of the transport stream and routes the packets to various areas within the satellite receiver 12. Audio may be output as an audio stream 27, which may be accepted by an audio decompresser 30. Video may be output as a video stream 25, which may be accepted by a video decompresser 28. The audio stream 25 and the video stream 27 may be fully compliant audio and video program elementary streams, respectively. In addition to routing packets of data, the packet demultiplexer 26 may also descramble encrypted data, provide various buffering of the formatted data, and handle a program clock reference to keep a local clock synchronized with the clock at the uplink center (e.g., service provider 2A). Data 29 may be output from the demultiplexer 26 and routed to a central processing unit (CPU) 16, which may assemble the data 29 into an EPG 22 stored in a memory or other storage medium 18.

The video decompresser 28 and the audio decompresser 30 may accept one or more video stream 25 and/or audio stream 27, respectively, and decompress them into baseband digital signals. The video stream 25 may then fed to a video digital to analog converter 32 and the audio stream 27 may be fed to a video digital to analog converter 34. The converters 32 and 34 may decode the digital signals and output resulting analog baseband signals to a TV/monitor 36 and/or a VCR device 38.

The EPG 22 may comprise a database or otherwise access a database containing information including, for example, names or titles of viewing events (programs), corresponding channel numbers and names, brief descriptions of the programs, start and finish times, and rating and content information related to the events. The central processing unit 16 may execute an EPG program 20, which may take the information stored in the EPG 22 and output a graphic file to a processor 17. The processor 17 may process the graphic file and output a signal, which, after being filtered by a filter 19, may become a video baseband signal 23 that may be combined with the video baseband signal 25 to be displayed on the television/monitor 36.

A user may manipulate the satellite receiver 12 via a keypad 39 or a remote control device 40. The remote control device 40 may communicate with the CPU 16 by sending an infrared, radio frequency, or other wired or wireless signal to a remote receiver 35, which may transfer commands to the CPU 16.

The EPG program 20 may comprise an instruction set that creates the EPG 22 and allows a user to manipulate the EPG 22, as discussed further below. While the EPG program 20 may be implemented as hardware, the EPG program 20 may alternatively or additionally comprise a software program stored in the memory 18. Memory 18 may be random access memory (RAM), but also may be flash, ferroelectric, or other nonvolatile memory, or conventional RAM with a battery backup. An LSI 64002 microprocessor may be used for the central processing unit 16. Also, the processor 17 may be an NTSC processor, such as the Sony CXD 1910, or anything else suitable.

As illustrated in FIG. 2, programming information contained in the EPG 22 may be displayed on the TV/monitor 36 in the form of a screen or graphical user interface 50. As an example, the screen or interface 50 may allow the user to examine programming information contained in the EPG 22 for programs scheduled for up to at least two days into the future. The user may summon the screen or interface 50, for example, by pressing the GUIDE key on the remote control device 40 or the keypad 39.

Current date, day of the week, and time 52 may be displayed in the screen or interface 50. The screen or interface 50 may list channels 54 in a column at a left edge, and may present timeslots 56 in a row across so as to form a grid 58 defined by the channels 54 and timeslots 56. For example, timeslots 56 may be divided into 30 minute intervals, but other intervals may be used as well. Titles or descriptions corresponding to individual programs 60 may be displayed corresponding spaces in the grid 58. Upon summoning of the screen or interface 50, a cursor 62 may be placed upon the program corresponding to the programming selection currently being viewed. The cursor 62, illustrated as an arrowhead in FIG. 2, may be implemented in any desired manner, for example, by drawing a box around the program, highlighting the program, or the like. Any of the programs may be selected for viewing by moving the cursor to the desired program via arrow keys located on the remote control device 40 or the keypad 39 and pressing the SELECT key, for example. If the selected event is to be shown in the future, the user may set up an event timer. Further, as the cursor 62 is placed over a particular one of the programs 60, additional information 64 regarding the particular program may be presented.

The user may traverse the channels 54 by scrolling via vertical arrow keys, a touchpad, or the like on the remote control device 40 or the keypad 39. The timeslots 56 may be traversed either by scrolling via left and right arrow keys, a touchpad or the like, or by specifying a number of hours, forward and/or reverse as available. The number of hours available to the user may be dependent on the total amount of information contained in the downlink datastream.

For example, the user may traverse the timeslots 56 by entering the number of hours and then pressing one of the horizontal arrow keys. If the right arrow key is pressed after entering a number "24," the screen or interface may display the timeslot located (in this example) 24 hours later than the timeslot indicated by the cursor 62, and the cursor 62 may be moved to the program corresponding to the new timeslot and currently selected channel. If the left arrow key is pressed after entering the number "24," the screen or interface 50 may display the timeslot located (in this example) 24 hours earlier than the timeslot indicated by the cursor 62, and the cursor 62 may be moved to the program corresponding to the new timeslot and currently selected channel.

If the desired program information is not currently in memory, the system may access the information from the downlink datastream. A message may appear on the TV/monitor 36 informing the user that the system is retrieving EPG information from the satellite. This may allow the user to either wait for the update or cancel the operation. If the desired information is not contained within the data stream 2, the user may be informed; otherwise, the desired information may be displayed on the TV/monitor 36 once retrieved.

In addition to such use control of displayed programming information, the EPG 22 may be controllable to determine a size of the textual information displayed. For example, an icon or graphical button 66 maybe displayed as part of the screen or interface 50. The icon 66 may be selectable to change a size of some or all of the textual information that is displayed as the screen or interface 50. As illustrated in FIG. 3, the cursor 62 may be positioned over the icon 66. In response to such positioning of the cursor 62, or in response to other user input such as pressing the SELECT key, for example, while the cursor 62 is so positioned, the EPG 22 may output the display or interface 50 with at least some of the textual information in a different size.

For example, as shown in FIG. 4, the textual information provided in the grid 58 may be increased in size. Such enlargement or magnification may make it easier for the user to see and read the textual information provided in the grid 58. As shown, the change in size may be applied to the entire grid 58 as displayed. The amount of information displayed may be reduced, as can be seen from a comparison of FIGS. 3 and 4, because of the increase in size of the textual information in the grid 58. In particular, the number of channels 54 and/or the number of timeslots 56 may be reduced.

Alternatively, certain information may be eliminated from the display or interface 50 when the textual information in the grid 58 is presented in a larger size. For example, the grid 58 may be displayed as the display or interface 50, with the current date/day/time 52 and/or the additional information 64 excluded, so that the grid 58 with enlarged textual information may encompass most or all of the display or interface 50 to increase the amount of information included in the grid 58 with enlarged textual information.

Other implementations may be envisioned as well. For example, the textual information to be displayed in a different size in response to the user input via the icon 66 may limited to that identified or specified by the user. If the user has identified a particular program 60, for example, by highlighting the program 60 before or after the user input via the icon 66, the size of only the textual information in the grid 58 for the identified program 60 may be changed, or the size of only the textual information in the grid 58 for the identified program 60 and the corresponding additional information 64 may be changed in size. It should be understood that any specified textual information may be altered in size, and any suitable manner for identifying or specifying the textual information to be altered in size may be used.

It should be understood that the change in size of the textual information in response to user input via the icon 66 is not limited to enlargement. For example, successive user input via the icon 66 may toggle between two sizes for the textual information to be displayed. Further, successive user input via the icon 66 may progressively increase and/or decrease the size of the textual information to be displayed, or other user input (e.g., scrolling) received while the icon 66 is selected or active may determine the size increase and/or decrease. Also, the icon 66 is not limited to a single icon or graphical button. For example, one icon for increasing and another icon for decreasing the size of textual information may be provided.

It should be understood that implementation of the EPG is not limited to that described above. Any known systems and methods for implementing an EPG as known in the art may be employed to achieve the basic operations of an EPG as described above, or other operations of an EPG as may be appropriate or desired for a given application. In other words, although embodiments are described herein with respect to the implementation of an EPG in the form of a grid as described above, it should be understood that other implementations are possible and not excluded.

It should also be understood that various implementations of methods for altering the size of textual information to be displayed are possible and may be envisioned based on the foregoing description. A particular example of one method is illustrated in FIG. 5. It should be understood that the method illustrated in FIG. 5 is a relatively simplistic, high level description, and that various modifications may be envisioned for particular applications, as appropriate or desired.

Control may begin at S500, with EPG information including textual information for display may be stored at a television receiving device or client device. The EPG information may be stored on the client as illustrated in FIG. 1, or may be stored locally elsewhere, as appropriate or desired. It should be understood that S500 may be optional, as access to the EPG information need not be local.

Next, at S502, a first user input may be received by the client device. The first user input may result, for example, from the user pressing a button on a remote control device and/or user interaction with a graphical user interface displayed by the client device via a display device, such as a television. In response to the first user input, at S504 the client device may output the EPG information to be displayed with the textual information in a first size. The particular EPG information output for display may be determined in any suitable manner, such as based on the current date, time and tuned channel as known in the art. Further, the format of the EPG information output for display, including the first size of the textual information therein, may be determined based on settings at the client device, for example, as known in the art.

Next, at S506, a second user input may be received by the client device. The second user input may result, for example, from the user interacting with a graphical user interface as described above, or from the user pressing a button or other input means on the remote control device. At S508, a determination may be made as to whether a particular portion of the displayed EPG information is identified. This may involve determining whether a user input has specified a particular portion, such as a particular program as described above, or may involve determining a particular setting of the client device for implementing the functionality of the second input.

If a particular portion is identified, then control may proceed to S510, where the client device may output the EPG information to be displayed with a second size of the textual information for the identified portion. As discussed above, the second size of the textual information may be larger than the first size of the textual information, as appropriate or desired. As also discussed above, this operation may be implemented by outputting as much of the EPG information as will fit with the second size of the textual information based on the predetermined area for the screen or interface to be displayed, by outputting only the identified portion for display, or by outputting only the identified portion and another specific portion or portions.

If a particular portion is not identified, then control may proceed to S512, where the client device may output the EPG information to be displayed with a second size of the textual information. This may be applied to all of the textual information of the EPG information to be displayed. As discussed above, it should be understood that the amount of the EPG information output to be displayed may change based on the second size of the textual information.

Once the EPG information is output and being displayed with the second size of the textual information, a determination maybe made at S514 as to whether the first user input is received. If so, then the client device may output the EPG information to be displayed with the first size of the textual information at S516. In other words, the first user input may cause the EPG information to be displayed with a given size of textual information, the second user input may cause the EPG information to be displayed with a different size of the textual information, and a second instance of the first user input received while the EPG information is being displayed with the second size of the textual information may cause the EPG information to be displayed with the original, given size of the textual information.

Alternatively or additionally, a determination maybe made at S518 as to whether a second instance of the second user input is received. If so, then the client device may output the EPG information to be displayed with a third size of the textual information at S520. In other words, the first user input may cause the EPG information to be displayed with a given size of textual information, the second user input may cause the EPG information to be displayed with a different size of the textual information, and a second instance of the second user input received while the EPG information is being displayed with the second size of the textual information may cause the EPG information to be displayed with yet another different size of the textual information.

Alternatively or additionally, a determination maybe made at S522 as to whether a third user input is received. If so, then the client device may output the EPG information to be displayed with a size of the textual information at S524 based on the third user input. In other words, the first user input may cause the EPG information to be displayed with a given size of textual information, the second user input may cause the EPG information to be displayed with a different size of the textual information, and a third user input received while the EPG information is being displayed with the second size of the textual information may cause the size of the textual information displayed to change in accordance with the third user input.

For example, in response to the second user input, the EPG information may be output for display with a predetermined increase in size for the textual information. Then, in response to the third user input, the predetermined increase in size of the textual information (the second size) may be varied to a third size, larger or smaller than the second size.

Alternatively, to implement output of the EPG information with a variable size of the textual information, the determination of S522 may be performed before the operations of S510 and S512 so that the size of the textual information output at S510 and S512 may be based on the third user input. For example, upon receiving the second user input at S508, the EPG information output for display may not change. Rather, the second user input may enable or activate functionality for controlling the size of the textual information based on receipt of the third user input.

Continuing control of the output of the EPG information for display may be performed in any suitable manner, as appropriate or desired. For example, at S526 a determination may be made as to whether other user input is received. Such other user input may include, but is not limited to, input that specifies a channel, a timeslot, a certain advance/regression in timeslot, a certain date, or the like. In response, the client device may output the EPG information to be displayed based on such other user input at S528. It should be understood that the current size of the textual information to be displayed may be maintained or may return to the first size, for example, depending on the other user input.

It should be understood that the other user input determined as received at S526 is for continued output of the EPG information for control to continue to S528. Otherwise, control may proceed to S530, where the output of the EPG information may be discontinued. For example, if the other user input received is selection of a particular program to be displayed, the EPG information may no longer be displayed. Alternatively or additionally, control may proceed to S530 after elapse of a predetermined amount of time without receiving further user input.

Again, it should be understood that the processes described above with respect to FIG. 5 is only an example, and is not intended to illustrate all possible processes that may be envisioned for implementing the various features described herein. As such, although not shown for the sake of clarity and simplicity, it should be understood that the various features described above may be incorporated in the method, as appropriate or desired, or any other suitable processes may be employed.

Although various details have been described herein with reference to particular embodiments, it is to be understood that these embodiments are merely illustrative of principles and applications. It is therefore to be understood that numerous modifications may be made to the illustrative embodiments and that other arrangements may be devised without departing from the spirit and scope of the present invention.

What is claimed is:

1. A method of providing an electronic program guide for display on a viewing screen, the method comprising:
   storing an electronic program guide on a client device, the electronic program guide including textual information corresponding to television programs scheduled to be broadcast, wherein the electronic programming guide is divided into at least a two-dimensional grid of timeslots and channels containing textual information corresponding to programs scheduled to be broadcast during respective ones of the timeslots and on respective ones of the channels;
   receiving a first user input at the client device, the first input corresponding to a request to display the electronic programming guide on the viewing screen;
   outputting the electronic program guide from the client device to be displayed on the viewing screen with at least one portion of the textual information that is contained in a timeslot of the timeslots in a first size in response to the first user input;
   receiving a second user input at the client device corresponding to a selection of a size-change indication icon, wherein there is no change in the output of the electronic programming guide immediately subsequent to the second user input;
   determining whether a third user input is received at the client device corresponding to a selection of the timeslot subsequent to receiving the second user input;
   if it is determined that the third user input has been received at the client device:
      identifying the at least one portion of the textual information that is contained in the timeslot in the electronic program guide by identifying the timeslot based on the third user input; and
      outputting the electronic program guide from the client device to be displayed with only: a) the identified at least one portion of the textual information that is contained in the timeslot; and b) the timeslot; in a second size that is different from the first size, the outputting in response to the second user input wherein:
         displaying the timeslot in the second size causes the timeslot to at least partially overlap at least one other of the timeslots; and
         the other timeslot is displayed in the first size;
   if it is determined that the third user input has not been received at the client device:
      outputting the electronic program guide from the client device to be displayed with greater or fewer timeslots and channels than displayed in response to the first user input, wherein all of the textual information that is contained in the greater or fewer timeslots is displayed in a second size that is different from the first size.

2. The method of claim 1, further comprising:
   receiving a second instance of the second user input; and
   outputting the electronic program guide from the client device to be displayed with only the identified at least one portion of the textual information that is contained in the timeslot in the first size in response to the second instance of the second user input.

3. The method of claim 1, further comprising:
   receiving a second instance of the second user input; and
   outputting the electronic program guide from the client device to be displayed with only the identified at least one portion of the textual information that is contained in the timeslot in a third size different from the first and second sizes in response to the second instance of the second user input.

4. The method of claim 1, wherein outputting the electronic program guide from the client device to be displayed with only the identified at least one portion of the textual information that is contained in the timeslot in a second size different from the first size increases a size of the identified at least one portion of the textual information that is contained in the timeslot.

5. The method of claim 4, wherein outputting the electronic program guide from the client device to be displayed with only the identified at least one portion of the textual information that is contained in the timeslot in a second size different from the first size reduces an amount of information in the electronic program guide to be displayed.

6. The method of claim 1, wherein:
   the electronic program guide to be displayed includes an area in addition to the two-dimensional grid of timeslots, the area containing additional textual information corresponding to a program of one of the timeslots;
   outputting the electronic program guide from the client device to be displayed with the at least one portion of the textual information that is contained in the timeslot in the first size in response to the first user input includes outputting the electronic program guide from the client device to be displayed with the additional information in a respective first size;
   outputting the electronic program guide from the client device to be displayed with only the identified at least one portion of the textual information that is contained in the timeslot in the second size different from the first size includes outputting the additional information in a respective second size different from the respective first size.

* * * * *